(12) United States Patent
Kralick

(10) Patent No.: US 6,355,368 B1
(45) Date of Patent: Mar. 12, 2002

(54) COOLING METHOD AND APPARATUS FOR USE WITH A FUEL CELL STACK

(75) Inventor: James H. Kralick, Albany, NY (US)

(73) Assignee: Plug Power Inc., Latham, NY (US)

( * ) Notice: Subject to any disclaimer, the term of this patent is extended or adjusted under 35 U.S.C. 154(b) by 0 days.

(21) Appl. No.: 09/434,710

(22) Filed: Nov. 5, 1999

(51) Int. Cl.$^7$ ............................................. H01M 08/12
(52) U.S. Cl. ........................... 429/26; 429/34; 429/120; 429/24
(58) Field of Search ............................. 429/26, 39, 38, 429/34, 120, 24, 22, 20

(56) References Cited

U.S. PATENT DOCUMENTS

| | | |
|---|---|---|
| 3,865,630 A | 2/1975 | Reimers |
| 4,315,893 A | 2/1982 | McCallister |
| 4,344,850 A * | 8/1982 | Grasso ........................ 210/664 |
| 4,578,324 A | 3/1986 | Koehler et al. |
| 4,678,723 A * | 7/1987 | Wertheim ..................... 429/17 |
| 4,824,740 A | 4/1989 | Abrams et al. |
| 4,828,940 A * | 5/1989 | Cohen et al. .................. 429/20 |
| 4,853,100 A | 8/1989 | Hsu |
| 5,064,732 A | 11/1991 | Meyer |
| 5,262,249 A | 11/1993 | Beal et al. |
| 5,358,799 A | 10/1994 | Gardner |
| 5,401,589 A | 3/1995 | Palmer et al. |
| 5,462,817 A | 10/1995 | Hsu |
| 5,582,929 A | 12/1996 | Dechovich |
| 5,687,576 A | 11/1997 | Moriguchi et al. |
| 6,101,988 A * | 8/2000 | Evans ........................ 123/41.5 |

OTHER PUBLICATIONS

Feldman, K. Thomas, Jr., Whiting, Glen H., "Mechanical Engineer", "The Heat Pipe", Feb. 1967, pp. 30–33.

* cited by examiner

Primary Examiner—Stephen Kalafut
Assistant Examiner—Raymond Alejandro
(74) Attorney, Agent, or Firm—Trop, Pruner & Hu, P.C.

(57) ABSTRACT

A system includes a stack of fuel cell flow plates and a condenser. The stack of fuel cell flow plates include openings to form an inlet manifold passageway and an outlet manifold passageway to communicate a coolant through the stack. The flow plates are capable of transferring thermal energy to the coolant to cause the coolant to change from a liquid state into a gas state. The condenser changes the coolant from the gas state to the liquid state. At least one conduit of the system is connected to communicate the coolant between the condenser and the inlet and outlet manifold passageways.

5 Claims, 7 Drawing Sheets

COOLING METHOD AND APPARATUS FOR USE WITH A FUEL CELL STACK

BACKGROUND

The invention generally relates to a cooling method and apparatus for use with a fuel cell stack.

A fuel cell is an electrochemical device that converts chemical energy produced by a reaction directly into electrical energy. For example, one type of fuel cell includes a proton exchange membrane (PEM), a membrane that may permit only protons to pass between an anode and a cathode of the fuel cell. At the anode, diatomic hydrogen (a fuel) is oxidized to produce hydrogen protons that pass through the PEM. The electrons produced by this oxidation travel through circuitry that is external to the fuel cell to form an electrical current. At the cathode, oxygen is reduced and reacts with the hydrogen protons to form water. The anodic and cathodic reactions may be described by the following equations:

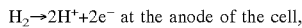
$H_2 \rightarrow 2H^+ + 2e^-$ at the anode of the cell, and

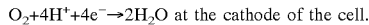
$O_2 + 4H^+ + 4e^- \rightarrow 2H_2O$ at the cathode of the cell.

Because a single fuel cell typically produces a relatively small voltage (around 1 volt, for example), several serially connected fuel cells may be formed out of an arrangement called a fuel cell stack to produce a higher voltage. The fuel cell stack may include different plates that are stacked one on top of the other in the appropriate order, and each plate may be associated with more than one fuel cell of the stack. The plates may be made from a graphite composite material or metal and may include various channels and orifices to, as examples, route the above-described reactants and products through the fuel cell stack. Several PEMs (each one being associated with a particular fuel cell) may be dispersed throughout the stack between the anodes and cathodes of the different fuel cells. In addition to the membrane, a catalyst and gas diffusion layer are sandwiched between the anode and cathode plates. The catalyst layer may be placed on the membrane or on the gas diffusion layer. The gas diffusion layer may be made out of an electrically conductive and porous diffusion material, such as a carbon cloth or paper material, for example.

Referring to FIG. 1, as an example, a fuel cell stack 10 may be formed out of repeating units called plate modules 12. In this manner, each plate module 12 includes a set of composite plates that may form several fuel cells. For example, for the arrangement depicted in FIG. 1, an exemplary plate module 12a may be formed from a cathode cooler plate 14, a bipolar plate 16, an anode cooler plate 18, a cathode cooler plate 20, a bipolar plate 22 and an anode cooler plate 24 that are stacked from bottom to top (as depicted in FIG. 1) in the listed order. The (anode or cathode) cooler plate functions as a heat exchanger by routing a coolant through flow channels in either the upper or lower surface of the cooler plate to remove heat from the stack 10. The surface of the cooler plate that is not used to route the coolant includes flow channels to communicate either hydrogen (for the anode cooler plates 18 and 24) or air (that provides the oxygen for the cathode cooler plates 14 and 20) to an associated fuel cell. The bipolar plates 16 and 22 include flow channels on one surface (i.e., on the top or bottom surface) to route hydrogen to an associated fuel cell and flow channels on the opposing surface to route oxygen to another associated fuel cell. Due to this arrangement, each fuel cell may be formed in part from one bipolar plate and one cooler plate, for example.

As an example, one fuel cell of the plate module 12a may include an anode-membrane-cathode sandwich, called a membrane-electrode-assembly (MEA), that is located between the anode cooler plate 24 and the bipolar plate 22. In this manner, the upper surface of the bipolar plate 22 includes flow channels to communicate oxygen near the cathode of the MEA, and the lower surface of the anode cooler plate 24 includes flow channels to communicate hydrogen near the anode of the MEA.

As another example, another fuel cell of the plate module 12a may be formed from another MEA that is located between the bipolar plate 22 and the cathode cooler plate 20. The lower surface of the bipolar plate 22 includes flow channels to communicate hydrogen near the anode of the MEA, and the upper surface of the cathode cooler plate 20 includes flow channels to communicate air near the cathode of the MEA. The other fuel cells of the plate module 12a may be formed in a similar manner. To communicate the hydrogen, oxygen and coolant to/from the various flow channels of the stack 10, the plates include openings that align to form passageways of a reactant and coolant manifold.

The coolant typically remains in its liquid state to remove heat from the fuel cell stack 10. As an example, the coolant may be de-ionized water, a fluid that has desirable heat transport properties. However, when the fuel cell stack is used to provide power to a house (for example) the fuel cell stack may reside outside of the house, and thus, the de-ionized water may freeze in colder climates. Therefore, a coolant that has a freezing point temperature that is lower than the freezing point temperature of de-ionized water may be used. This coolant may not remove heat from the stack as efficiently as de-ionized water. As a result, an increased pumping rate (as compared to the pumping rate that is used with de-ionized water) may be needed to maintain the same heat rejection rate and fluid delta temperature that are provided by the de-ionized water. This increased pumping rate, in turn, may increase parasitic losses in the fuel cell system and thus, decrease the overall efficiency of the system.

Thus, there is a continuing need for a system that addresses one or more of the above-stated problems.

SUMMARY

In an embodiment of the invention, a method includes using different states of a coolant to establish a thermal siphon to circulate the coolant through a fuel cell stack. The coolant has a boiling point temperature that is near a predetermined operating temperature of the fuel cell stack.

In another embodiment of the invention, a system includes a stack of fuel cell flow plates and a condenser. The stack of fuel cell flow plates include openings to form an inlet manifold passageway and an outlet manifold passageway to communicate a coolant through the stack. The flow plates are capable of transferring thermal energy to the coolant to cause the coolant to change from a liquid state into a gas state. The condenser changes the coolant from the gas state to the liquid state. At least one conduit of the system is connected to communicate the coolant between the condenser and the inlet and outlet manifold passageways.

The advantages of the invention may include one or more of the following: the system may maintain a substantially uniform cell temperature across the entire active fuel cell area; the system may be self-regulating and thus, may not require an active control; no liquid pump may be required to circulate the coolant through the fuel cell stack; the system may operate over a wide range of ambient temperatures while maintaining a relatively constant fuel cell temperature; the system may have a low operating cost; and the system may be more efficient than conventional systems.

Advantages and other features of the invention will become apparent from the following description, from the drawing and from the claims.

DETAILED DESCRIPTION

Figure 1:
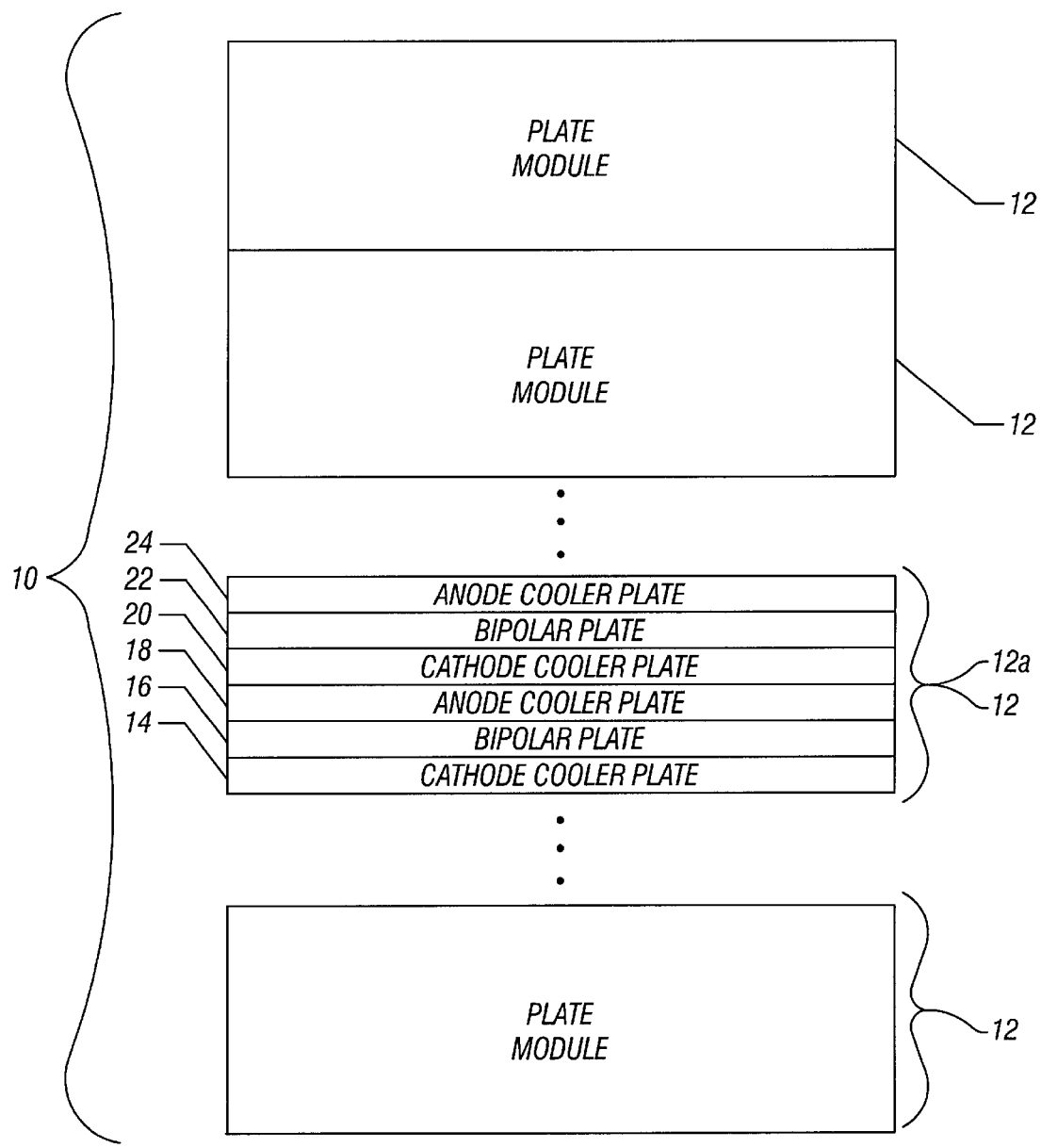
FIG. 1 is a schematic diagram illustrating a fuel cell stack according to the prior art.
Figure 2:
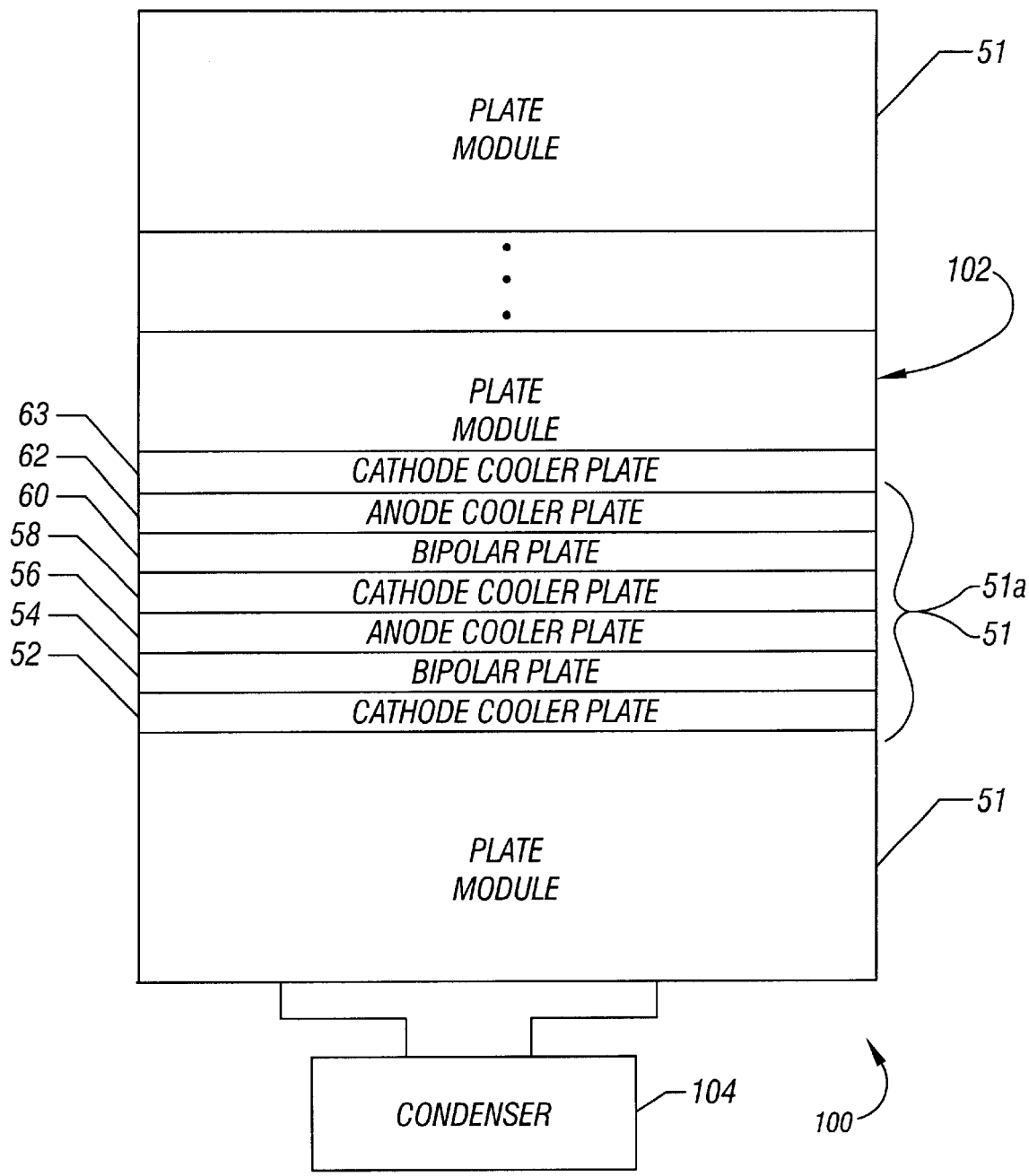
FIG. 2 is a schematic view of a fuel cell system according to an embodiment of the invention.

Referring to FIG. 2, an embodiment of a fuel cell system 100 in accordance with the invention circulates a coolant to regulate fuel cell temperatures of a fuel cell stack 102. The fuel cell system 100 may provide power to a house, for example. Unlike conventional arrangements, the coolant does not remain in a single state (a liquid state, for example). Instead, the coolant alternates between two phases, or states (between a gas state and a liquid state), as the coolant circulates through the system 100, and these different coolant states provide significant advantages over conventional systems, as described below.

More particularly, the coolant has a boiling point temperature near the desired operating temperature (a temperature between approximately 60° Celsius (C.) and 80° C., as one of many possible examples) for the fuel cells of the stack 102. In this manner, as described below, the coolant is introduced in its liquid state into the fuel cell stack 102. However, the heat that is dissipated by the fuel cell stack causes the coolant to boil and thus, change into a gas state (i.e., change into a coolant vapor) while passing through the fuel cell stack 102. The temperature of the coolant vapor remains near the predetermined fuel cell operating temperature (i.e., remains near its boiling point temperature) and removes excess heat from the fuel cell stack 102, as described below.

Outside of the stack 102, the system 100 changes the coolant vapor into its liquid state before being circulating the coolant back through the stack 102 to remove additional heat. Therefore, due to this arrangement, the two phases of the coolant establish a thermal siphon in the system 100 that continuously circulates the coolant through the stack 102 without requiring a pump. Furthermore, the temperature of the coolant vapor does not substantially exceed its boiling point temperature (i.e., the predetermined operating temperature for the fuel cells), thereby eliminating the need for an active control to regulate the temperature of the fuel cell stack 102.

Because the temperature of the coolant in its liquid state is below its boiling point temperature when the coolant enters the stack fuel cell stack 102, additional thermal energy may be absorbed by the coolant from the stack 102 until the requisite heat of vaporization of the coolant is supplied by the stack 102. At this point, the coolant remains near the boiling point temperature but enters the gas state in the fuel cell stack 102 by changing into the coolant vapor. The system 100 routes the coolant vapor from the fuel cell stack 102 into a condenser 104 (of the system 100) that condenses the coolant vapor back into a liquid to release the thermal energy that was captured from the stack 102. Subsequently, the liquid coolant returns to the fuel cell stack 102 to remove additional heat.

As examples, in some embodiments, the coolant may be formed from HFE-7100 ($C_4F_9OCH_3$), a hydroflouroether that is made by 3M Corporation; HFE-7200 ($C_4F_9OC_2H_5$), another hydroflouroether that is made by 3M Corporation; or a mixture of these fluids, as examples. Regardless of the composition of the coolant, the boiling point temperature of the coolant is near the desired predetermined operating temperature of the fuel cells. This boiling point may be achieved by selecting a coolant fluid that has the desired boiling point or by mixing different coolant fluids together, as can be appreciated by those skilled in the art.

Figure 3:
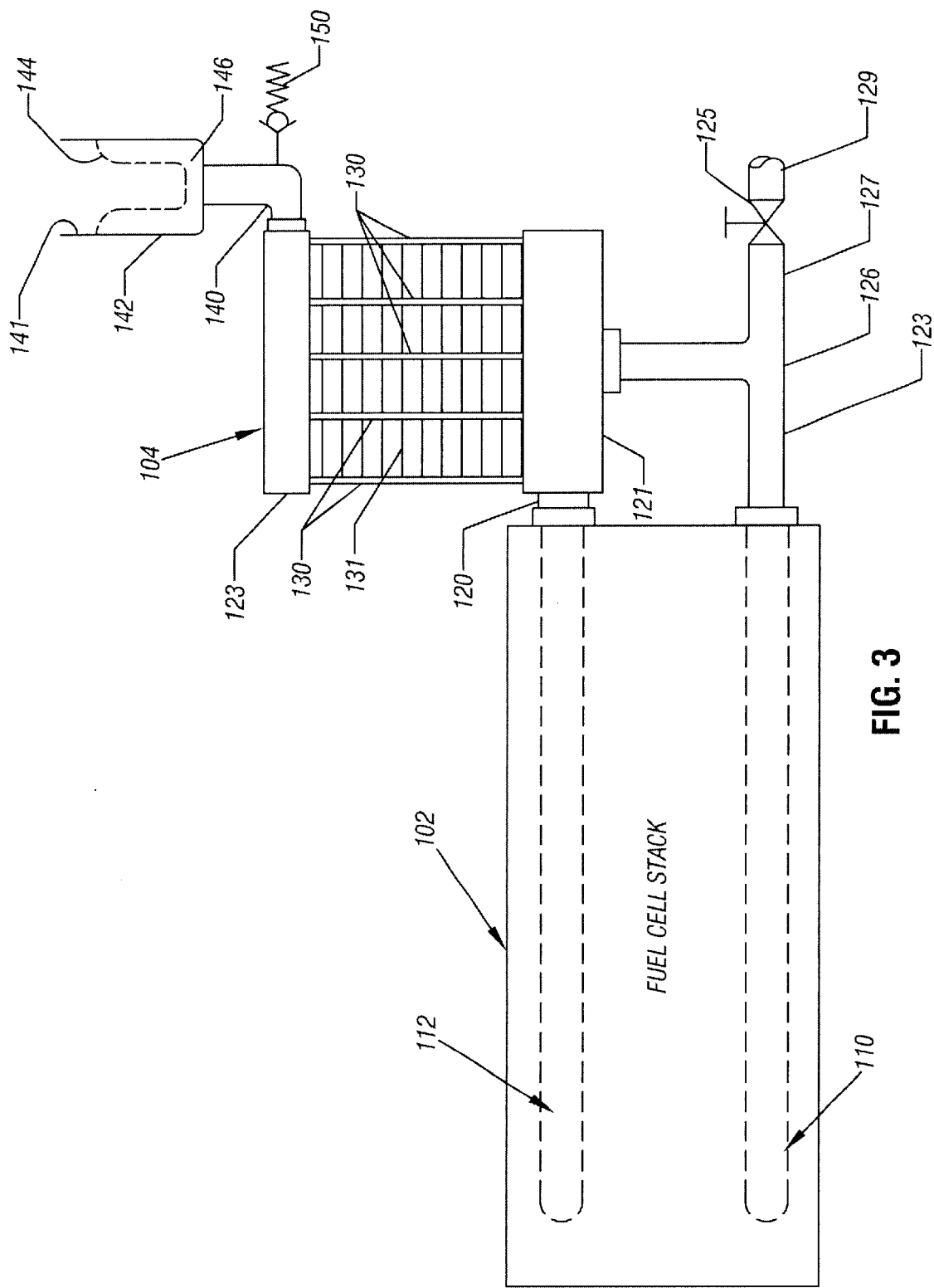
FIGS. 3 and 5 are more detailed schematic diagrams of fuel cell systems according to different embodiments of the invention.

Referring to FIG. 3, the coolant (in its liquid state) enters the fuel cell stack 102 via a coolant inlet manifold passageway 110, and the coolant vapor leaves the fuel cell stack 102 via a coolant outlet manifold passageway 112. Between the inlet 110 and outlet 112 manifold passageways, the coolant passes through surface flow channels of flow plates (of the fuel cell stack 102) that are each associated with removing thermal energy from the stack 102 and associated with providing a reactant to an associated fuel cell, as described below. In this manner, the fuel cell stack 102 may be formed from different types of flow plates (described below) that may be grouped together into repeating units called plate modules 51 that are depicted in FIG. 2.

Referring back to FIG. 2, an exemplary plate module 51a (having a design similar to the other plate modules 51) includes flow plates (graphite composite or metal plates, for example) that include flow channels to route reactants for several fuel cells and to direct the coolant through the fuel cell stack. In this manner, the flow plates include aligned openings to form passageways of a manifold that communicates reactants and the coolant with the stack 102. As an example, the plate module 51a may include the following flow plates: bipolar plates 54 and 60; cathode cooler plates 52 and 58; and anode cooler plates 56 and 62.

Figure 4A:
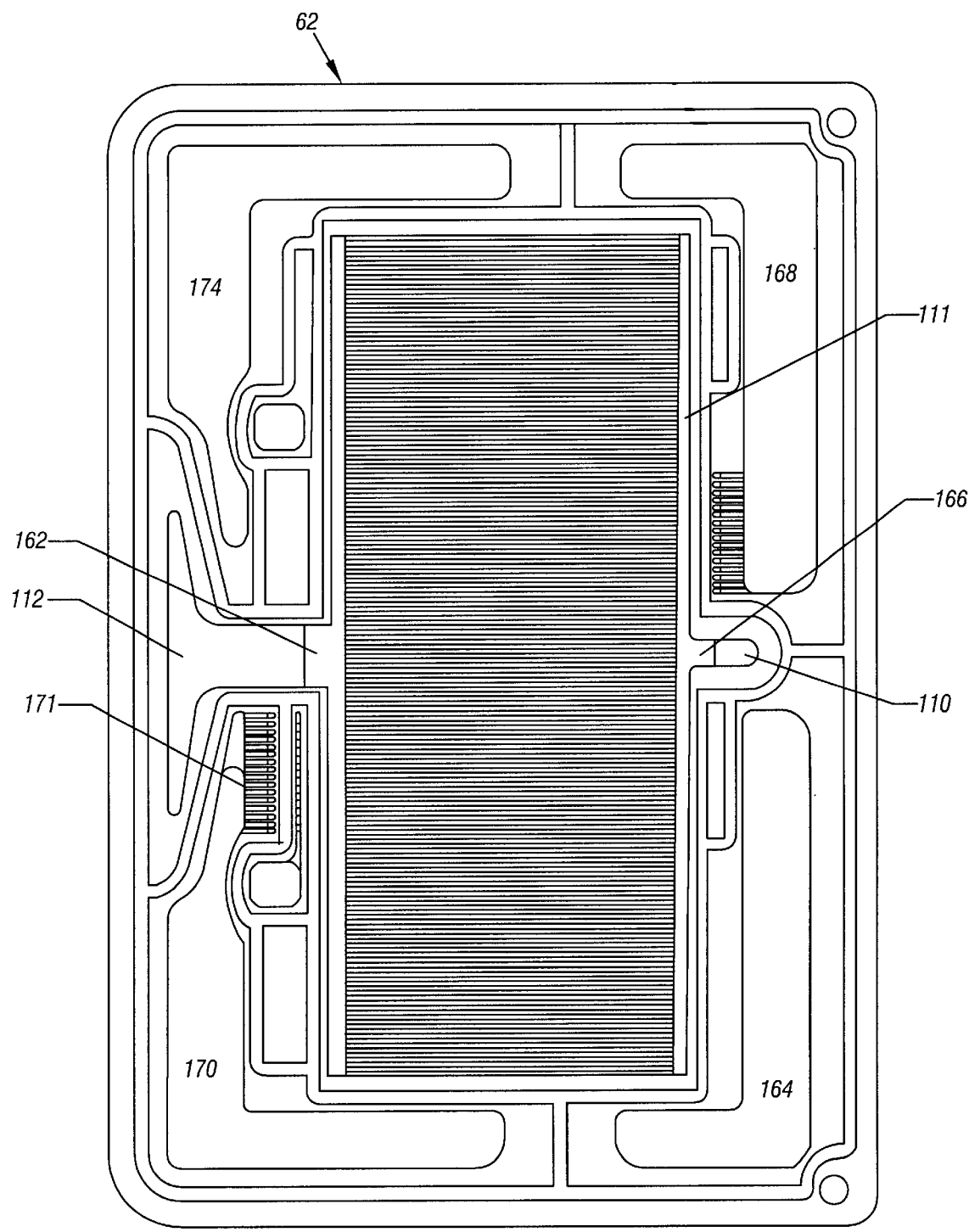
FIG. 4A is a view of the coolant side of an anode cooler plate of the fuel cell stack according to an embodiment of the invention.

Referring also to FIG. 4A that depicts a view of the coolant side of the anode cooler plate 62, the anode cooler plate 62 includes openings that partially form the manifold for communicating the reactants and the coolant. In this manner, the anode cooler plate 62 may include an opening 170 to form part of an inlet passageway of the manifold for communicating hydrogen to the fuel cell stack 102; and the anode cooler plate 62 may include an opening 168 to form part of an outlet passageway of the manifold for removing unconsumed hydrogen from the fuel cell stack 102. Similarly, openings 174 and 164 in the anode cooler plate 62 may form partial inlet and outlet passageways, respectively, of the manifold for communicating air (to deliver oxygen to the fuel cells of the stack 102); and openings 166 and 162 in the anode cooler plate 62 may form parts of the coolant inlet 110 and outlet 112 manifold passageways, respectively. The sizes of the manifold passageway openings may be formed to optimize the flow of the communicated fluid. For example, as depicted in FIG. 4A, the coolant inlet manifold passageway opening 110 may be smaller than the larger T-shaped coolant outlet manifold passageway opening 112 for purposes of establishing an appropriate pressure drop across coolant flow channels 111 of the anode cooler plate 62. As depicted in FIG. 4A, in some embodiments, the flow channels 111 may be generally straight and parallel to each other. The other flow plates have similar openings that align to form the reactant and coolant manifold passageways.

Figure 4B:
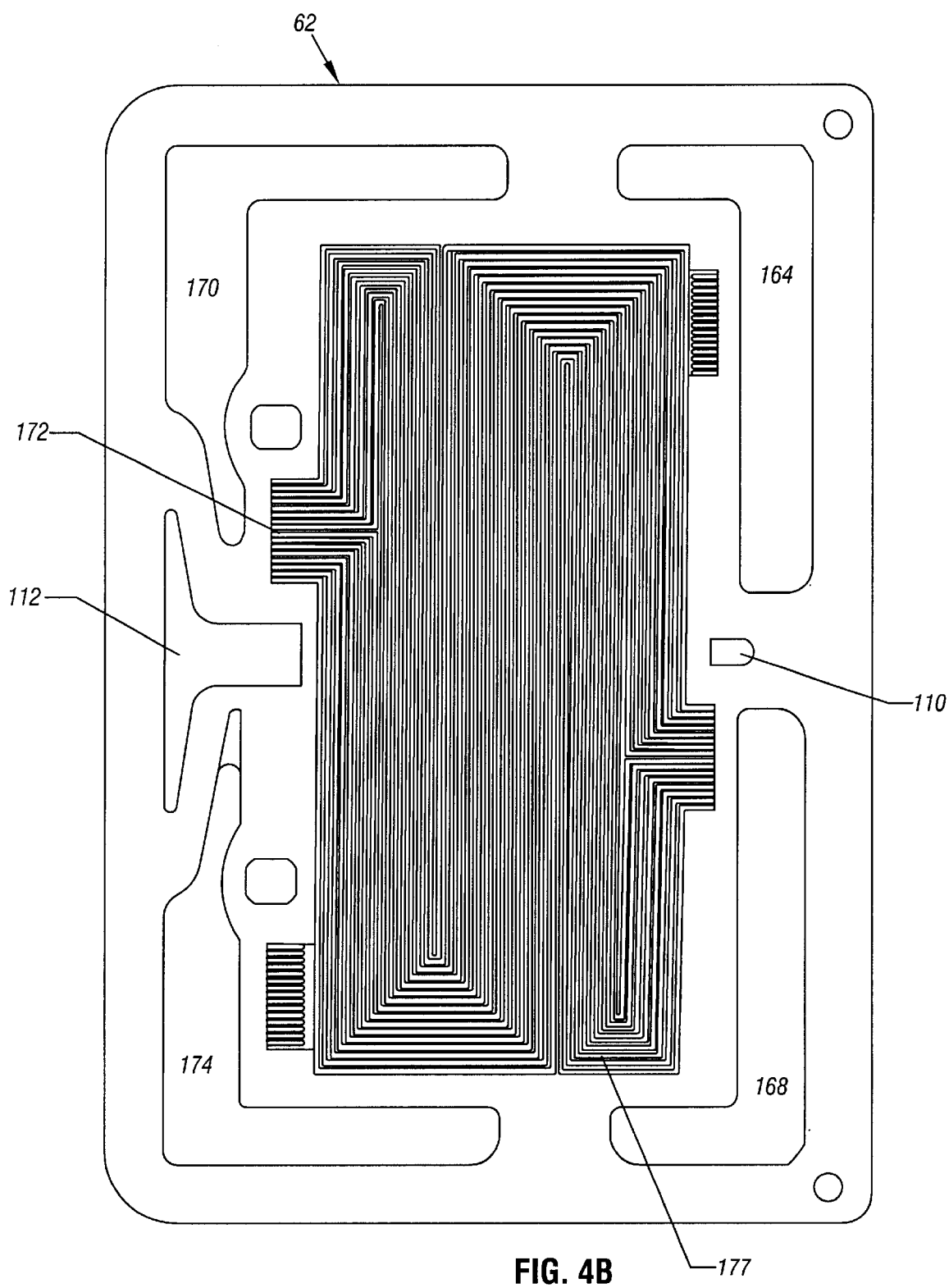
FIG. 4B is a view of the reactant side of an anode cooler plate of the fuel cell stack according to an embodiment of the invention.

FIG. 4B depicts the opposite, reactant side of the anode cooler plate 62 rotated by 180 degrees with respect to the orientation of the plate 62 that is shown in FIG. 4A. As depicted in FIG. 4B, the reactant side includes flow channels 177 (serpentine flow channels, for example) for communicating hydrogen to an adjacent gas diffusion layer, for example. Referring to both FIGS. 4A and 4B, the coolant side of the anode cooler plate 62 includes dive through headers 171 (see FIG. 4A) that have openings through the plate 62 for purposes of establishing communication between the hydrogen inlet 170 and outlet 168 passageways and the hydrogen flow channels 177 of the reactant side of the plate 62. In this manner, the dive through headers 171 (see FIG. 4A) communicate with corresponding dive through headers 172 (see FIG. 4B) that are located on the reactant side of the plate 62.

Between the anode cooler plate 62 and the lower adjacent bipolar plate 60 (see FIG. 2), regions are established that are associated with the air, hydrogen and coolant flows. For example, the openings 162 and 166 create regions that are associated with the coolant flow, and the openings 164 and 174 create regions that are associated with the air flow.

Thus, the above-described stacking of the flow plates establishes fuel cells between adjacent anode cooler and bipolar plates; and between adjacent cathode cooler and bipolar plates. The coolant flows through coolant surface flow channels between each pair of adjacent anode and cathode cooler plates to remove heat from the associated pair of fuel cells. The flow plates provide the requisite heat of vaporization to cause the liquid coolant to boil and change into the coolant vapor.

In some embodiments, the flow plates may be stacked in a general horizontal direction, with the coolant inlet manifold passageway 110 being located near the bottom of the stack and the coolant outlet manifold passageway 112 being located near the top of the stack. Furthermore, in some embodiments, the condenser 104 may be oriented in a vertical direction, as depicted in FIG. 3. However, other orientations are possible in other embodiments.

The condenser 104 may include an intake manifold 121 that directs the coolant vapor from the outlet manifold passageway 112 into vertical cooling tubes 130 of the condenser 104. The cooling tubes 130, in turn, are in contact with cooling fins 131 that provide additional surface area to remove heat from the cooling tubes 130 to condense the coolant vapor into a liquid.

The intake manifold 121 is connected to an inlet conduit 120 that is connected to the outlet manifold passageway 112. The condensed, liquid coolant drains out of the cooling tubes 130, into the manifold 121 and then out of a bottom opening of the manifold 121. In this manner, the bottom opening of the manifold 121 is connected to an upwardly extending branch of a T-shaped tubular coupling 126. A horizontally extending branch of the coupling 126 forms a liquid coolant return line 123 that is connected to deliver the liquid coolant to the inlet manifold passageway 110. Another horizontally extending branch of the coupling 126 forms a liquid coolant fill line 127 that is coupled to a valve 125 that controls access to a coolant fill port 129. In this manner, coolant may be added to the system 100 by opening the valve 125 and adding coolant to the port 129. The valve 125 is otherwise closed.

For purposes of maintaining the boiling point temperature of the coolant near the desired predetermined fuel cell operating temperature, the system 100 may include a chamber 142 to regulate the pressure inside the condenser 104 and thus, regulate the boiling point temperature of the coolant. For example, in some embodiments, the chamber 142 maintains the pressure inside the condenser 104 at atmospheric pressure. To accomplish this, the chamber 142 may have an open end 141 that is exposed to the atmosphere. A low friction, rolling diaphragm 144 may form a seal between the open end 141 and the other end (of the chamber 141) that is in communication (via an elbow conduit 140, for example) with an upper exhaust manifold 123 of the condenser 104. The diaphragm 144 establishes a closed but expandable expansion space 146 to receive air that escapes from the coolant as the coolant reaches its boiling point. In this manner, the diaphragm 144 expands or contracts as needed to maintain the pressure inside the system 100 at atmospheric pressure.

Thus, as depicted in FIG. 3, the expansion space 146 is located in a non-condensing region of the system 100 and accommodates the air that escapes the liquid coolant when the coolant boils due to the insolubility of the boiling coolant. When the coolant condenses, the air solubility of the coolant increases, and air from the expansion space 146 dissolves into the liquid coolant.

Among the other features of the system 100, the manifold 123 includes openings that are in communication with the upper ends of the cooling tubes 130. The manifold 123 also includes an opening to establish communication with the conduit 140. A relief valve 150 may be coupled to the conduit 140 to relieve pressure from the condenser 104 if the pressure inside the condenser 104 substantially exceeds atmospheric pressure.

Figure 5:
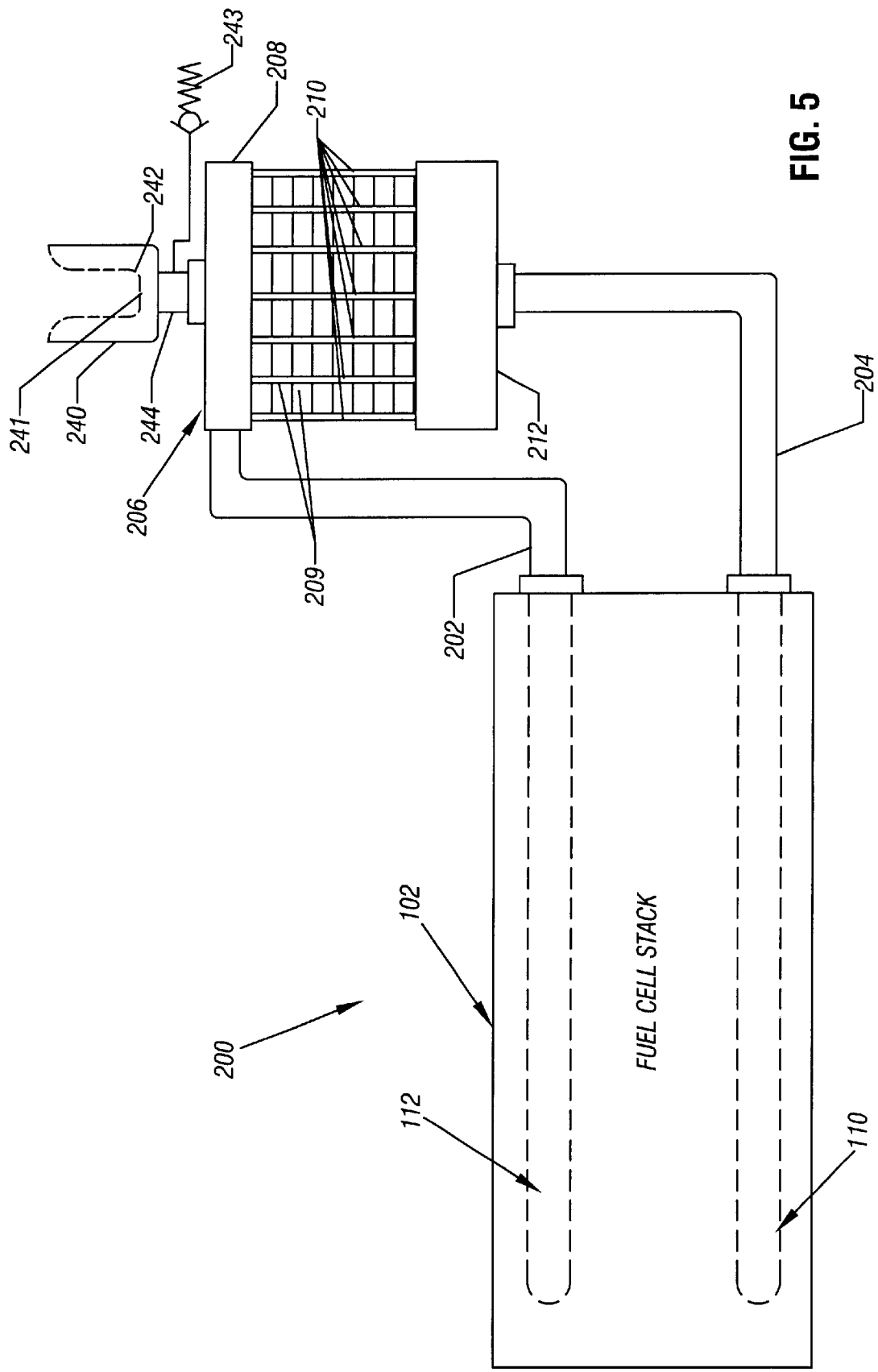

Other embodiments of the fuel cell system are within the scope of the appended claims. For example, referring to FIG. 5, in some embodiments, a fuel cell system 200 may be used in place of the fuel cell system 100. Unlike the system 100, the system 200 includes a vapor line 202 that delivers the coolant vapor from the outlet manifold passageway 112 to a condenser intake manifold 208 that is located on top of a condenser 206 (of the system 200). In this manner, the coolant vapor condenses in vertical cooling tubes 210 of the condenser 206, and the condensed liquid coolant drains out of the cooling tubes 210 into a lower outlet manifold 212. The lower outlet manifold 212, in turn, includes a bottom opening that is connected to a liquid line 204 that returns the liquid coolant back to the inlet manifold passageway 110.

The intake manifold 208 includes an opening that is connected to the vapor line 202 and includes openings to direct the coolant vapor into the cooling tubes 210. The cooling tubes 210, in turn, are connected to cooling fins 209 that provide additional surface area to remove heat to condense the coolant. Because the coolant traverses the entire length of the cooling tubes 210 from top to bottom, the condenser 206 may super cool the coolant. However, this additional drop in temperature (as compared to the temperature of the condensed liquid coolant in the system 100) may be negligible in some embodiments.

The intake manifold 208 may also include an upper opening to communicate with an expansion space 241 of an chamber 240 similar to the expansion arrangement that is described above for the system 100. In this manner, a diaphragm 242 establishes the expansion space 241, and a conduit 244 connects an opening of the manifold 206 to an opening of the chamber 240. A relief valve 243 may be coupled to the conduit 244 to relieve pressure from the condenser 206 if the pressure inside the condenser 206 substantially exceeds atmospheric pressure.

Figure 6:
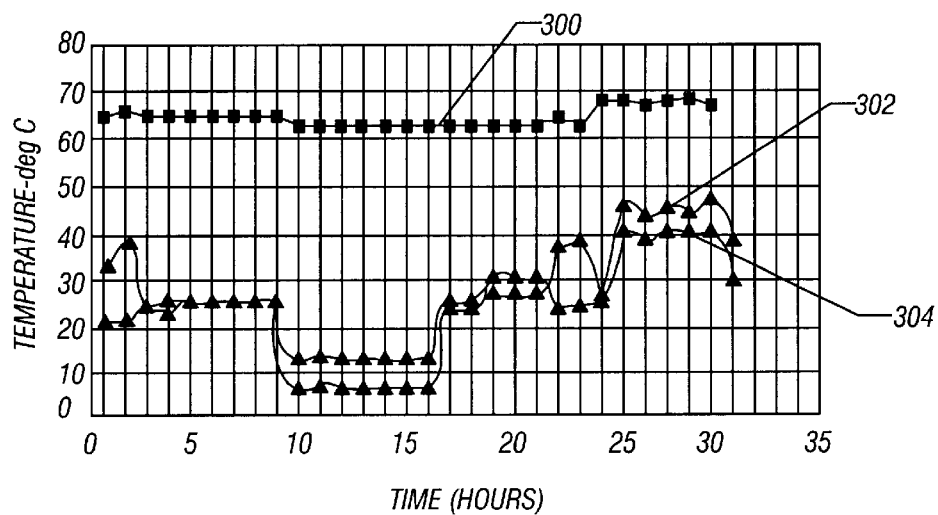
FIG. 6 illustrates coolant temperature versus time plots taken at different points of the fuel cell systems of FIGS. 3 and 5.
Figure 7:
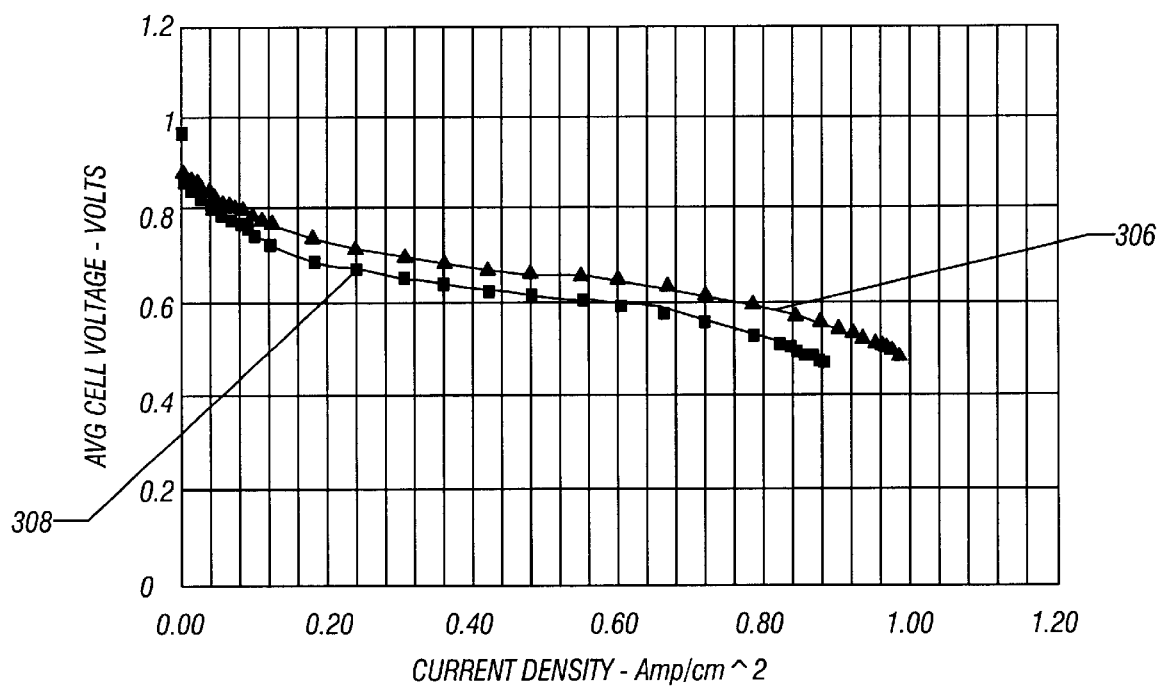
FIG. 7 illustrates polarization plots for different coolants.

A test was conducted in which a system that is similar to the fuel cell system 200 was placed in an environmental test chamber. An actual operating fuel cell stack was not used. Instead, for this test, the stack 102 was formed from cooler plates, and heater pads were used to simulate the heat of rejection that is experienced by the fuel cell stack when operating. The coolant that was used was HFE-7100, a coolant that is available from 3-M Corporation and has a boiling point of approximately 64° C. FIG. 6 depicts the results of the test. A plot 300 of the plate temperature versus time demonstrates that the flow plate temperature remains near the boiling point of the coolant (i.e., the temperature remains near approximately 64° C.). Also shown in FIG. 6 are plots 302 and 304 of the temperatures of the chamber and inlet fluids, respectively. As depicted, in this particular embodiment, the cell temperature rose when the ambient temperature (i.e., the temperature inside the chamber) rose above approximately 45° C., a temperature rise that may be due to condenser limitations only. FIG. 7 depicts three polarization curves 306 for the system 100, 200, and a polarization curve 308 for a reformate as a reference. One of the curves 306 is a plot of the polarization curve for a system that uses de-ionized water as a coolant; one of the curves 306 is a plot of the polarization curve of the system 100; and the other curve 306 is a plot of the polarization curve of the system 200. As depicted in FIG. 7, the three curves 306 are essentially the same and demonstrate the fuel cell performance that may be achieved by using the above-described systems 100 and 200.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A system comprising:

a stack of fuel cell flow plates including openings to form an inlet manifold passageway and an outlet manifold passageway to communicate a coolant through the stack, the flow plates capable of transferring thermal energy to the coolant to cause the coolant to change from a liquid state into a gas state;

a condenser to change the coolant from the gas state to the liquid state;

at least one conduit connected to communicate the coolant between the condenser and the inlet and outlet manifold passageways;

a chamber in communication with the condenser, the chamber including a first opening in communication with the atmosphere and a second opening in communication with the condenser; and a diaphragm located in the chamber between the first and second openings to allow expansion to substantially maintain atmospheric pressure in the condenser.

2. The system of claim 1, further comprising:

a relief valve controlling communication between the condenser and a region surrounding the condenser to prevent pressure in the condenser from substantially exceeding atmospheric pressure.

3. The system of claim 1, wherein said at least one conduit is adapted to communicate the coolant from the outlet manifold passageway to the condenser and communicate the coolant from the condenser into the inlet manifold passageway.

4. The system of claim 3, wherein said at least one conduit is further adapted to furnish the coolant from the outlet manifold passageway to at least one bottom opening of the condenser.

5. The system of claim 3, wherein said at least one conduit is further adapted to furnish the coolant from the outlet manifold passageway to at least one top opening of the condenser.

* * * * *